(12) United States Patent
Drury et al.

(10) Patent No.: US 7,157,891 B1
(45) Date of Patent: Jan. 2, 2007

(54) DC-DC VOLTAGE CONVERTER WITH REDUCED OUTPUT VOLTAGE RIPPLE

(75) Inventors: Rob Drury, Santa Clara, CA (US);
Peter J. Hopper, San Jose, CA (US);
Kyuwoon Hwang, Palo Alto, CA (US);
Peter Johnson, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 61 days.

(21) Appl. No.: 11/057,967

(22) Filed: Feb. 15, 2005

(51) Int. Cl.
*G05F 1/44* (2006.01)

(52) U.S. Cl. .......................... 323/282; 323/272; 363/71

(58) Field of Classification Search ............ 363/65–71, 363/78, 97, 101, 16–20; 323/222, 271, 282–285, 323/259, 272
See application file for complete search history.

(56) References Cited

U.S. PATENT DOCUMENTS

| | | | | |
|---|---|---|---|---|
| 4,736,151 A | * | 4/1988 | Dishner | 323/224 |
| 5,477,132 A | * | 12/1995 | Canter et al. | 323/282 |
| 6,084,790 A | * | 7/2000 | Wong | 363/71 |

* cited by examiner

*Primary Examiner*—Rajnikant B. Patel
(74) *Attorney, Agent, or Firm*—Vedder, Price, Kaufman & Kammholz, P.C.

(57) ABSTRACT

An integrated DC—DC converter circuit in which multiple switched circuits operate in parallel to drive the output electrode with multiple pulsed charging voltages such that the corresponding respective output ripple voltage components combine with destructive interference, thereby reducing the net output ripple voltage.

17 Claims, 3 Drawing Sheets

DC-DC VOLTAGE CONVERTER WITH REDUCED OUTPUT VOLTAGE RIPPLE

BACKGROUND OF THE INVENTION

1. Field of the Invention

The present invention relates to DC voltage conversion circuits, and in particular, to DC—DC voltage conversion circuits.

2. Description of the Related Art

As is well known, a DC-to-DC converter is a circuit that converts a DC input voltage to a DC output voltage, with the output voltage typically being different, i.e., having a different magnitude (irrespective of polarity), than the input voltage. There are at least three general types: a step down converter, also known as a "buck" converter; a step up converter, also known as a "boost" converter; and a variable converter capable of producing an output voltage which is selectively a fraction or multiple of the input voltage, also known as a "buck-boost" converter.

Referring to FIG. 1A, a conventional buck converter accepts a DC input voltage VIN to produce a DC output voltage VOUT. The input voltage VIN is applied across a shunt rectifier in the form of a diode D in a switched manner by virtue of a series switch in the form of a transistor Q which is turned on and off according to the asserted and de-asserted states, respectively of a control voltage VC. (It should be noted that throughout this discussion, the transistors used as the switching elements are depicted as NPN bipolar junction transistors. However, it will be readily understood by one of ordinary skill in the art that, in accordance with well known circuit design principles, other transistors, such as PNP bipolar junction transistors and metal oxide semiconductor field effect (MOSFET) transistors, both N-type and P-type, can be substituted with appropriate reversals in voltage polarities as necessary.)

When the transistor Q is turned on, current will begin to flow through the inductor L to the shunt output capacitor C, and thereby begin charging the capacitor C. When the transistor Q is turned off, the inductor current will continue to flow, but now through the diode D instead of the transistor Q. As the control voltage VC is periodically asserted and de-asserted, this process repeats, thereby producing a DC output voltage VOUT with an average value that is proportional to the input voltage VIN, with such proportion, or fraction, being approximately equal to the duty cycle (ratio of the asserted state duration to the sum of the asserted and de-asserted states durations) of the control voltage VC.

Referring to FIB. 1B, a conventional boost converter also has the inductor L in series (now at the input), but now has the diode D in series and the switching transistor Q connected in shunt, substantially as shown. During assertion of the control voltage VC, the transistor Q is turned on, thereby initiating current flow through the inductor L. During de-assertion of the control voltage VC, the transistor Q is turned off, and the inductor current flows through the diode D to charge the capacitor C. This produces an output voltage VOUT which is a multiple of the input voltage VIN, with such multiple being approximately equal to the inverse of the difference between unity and the duty cycle of the control voltage VC.

Referring to FIG. 1C, a conventional buck-boost converter has the transistor Q in series, like the buck converter, and the diode D in series (but reversed in polarity) like the boost converter. The inductor L is now connected in shunt between the transistor Q and diode D substantially as shown. During assertion of the control voltage VC, the transistor Q is turned on and inductor current flows. During de-assertion of the control voltage VC, the transistor Q is turned off, thereby causing the continuing inductor current to flow through the diode D and charge the capacitor C. This produces a DC output voltage VOUT with an average value that is selectively a fraction or multiple of the input voltage VIN. Such fraction or multiple is approximately equal to the quotient of the duty cycle (of the control voltage VC) divided by the difference between unity and the duty cycle. Hence, for duty cycles less than 0.5 this circuit is a buck converter, while for duty cycles greater than 0.5 this circuit is a boost converter.

As is well known, these types of DC—DC converters have historically been implemented using discrete components, primarily due to the amount of current required to maintain the average output voltage with as little voltage ripple as possible. As a result, in order to also maintain some minimum efficiency on part of the inductor, the size of the inductor is often larger than what might be desired for a more compact circuit design, since reducing the size of the inductor will increase the likelihood of magnetic saturation, thereby decreasing the efficiency.

SUMMARY OF THE INVENTION

In accordance with the presently claimed invention, an integrated DC—DC converter circuit has multiple switched circuits that operate in parallel to drive the output electrode with multiple pulsed charging voltages such that the corresponding respective output ripple voltage components combine with destructive interference, thereby reducing the net output ripple voltage.

In accordance with one embodiment of the presently claimed invention, an integrated buck converter circuit includes electrodes, switching circuitry, shunt rectification circuitry and a plurality of inductances. The electrodes include an input electrode to convey a DC input voltage, a plurality of intermediate electrodes and an output electrode to convey a DC output voltage which is less than the DC input voltage. The switching circuitry is coupled between the input electrode and the plurality of intermediate electrodes, and responsive to a plurality of control signals by providing, between the input electrode and respective ones of the plurality of intermediate electrodes, a plurality of current paths having respective conduction states during time intervals which are at least partially mutually exclusive. The shunt rectification circuitry is coupled to the plurality of intermediate electrodes. Each of the plurality of inductances is coupled between a respective one of the plurality of intermediate electrodes and the output electrode.

In accordance with another embodiment of the presently claimed invention, an integrated boost converter circuit includes electrodes, a plurality of inductances, shunt switching circuitry and rectification circuitry. The electrodes include an input electrode to convey a DC input voltage, a plurality of intermediate electrodes and an output electrode to convey a DC output voltage which is greater than the DC input voltage. Each of the plurality of inductances is coupled between the input electrode and a respective one of the plurality of intermediate electrodes. The shunt switching circuitry is coupled to the plurality of intermediate electrodes and responsive to a plurality of control signals by providing a plurality of shunt current paths having respective conduction states during time intervals which are at least partially mutually exclusive. The rectification circuitry is coupled between the plurality of intermediate electrodes and the output electrode.

In accordance with still another embodiment of the presently claimed invention, an integrated buck-boost converter circuit includes electrodes, switching circuitry, a plurality of shunt inductances and rectification circuitry. The electrodes include an input electrode to convey a DC input voltage, a plurality of intermediate electrodes and an output electrode to convey a DC output voltage which is selectively less than or greater than the DC input voltage. The switching circuitry is coupled between the input electrode and the plurality of intermediate electrodes, and responsive to a plurality of control signals by providing, between the input electrode and respective ones of the plurality of intermediate electrodes, a plurality of current paths having respective conduction states during time intervals which are at least partially mutually exclusive. Each of the plurality of shunt inductances is coupled to a respective one of the plurality of intermediate electrodes. The rectification circuitry is coupled between the plurality of intermediate electrodes and the output electrode.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1A:
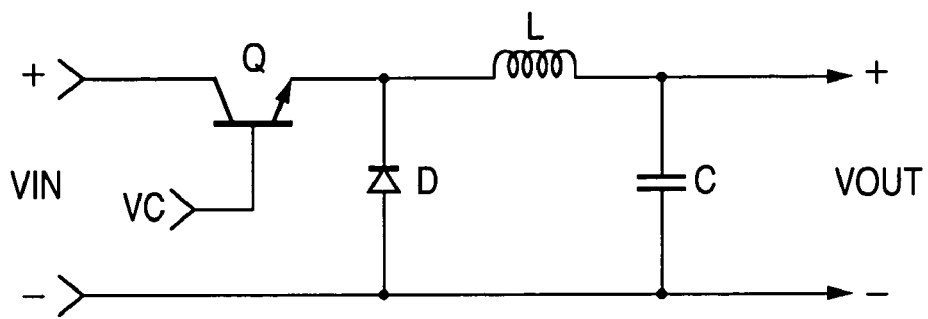
FIGS. 1A, 1B and 1C are schematic diagrams of conventional DC—DC converters.
Figure 2A:
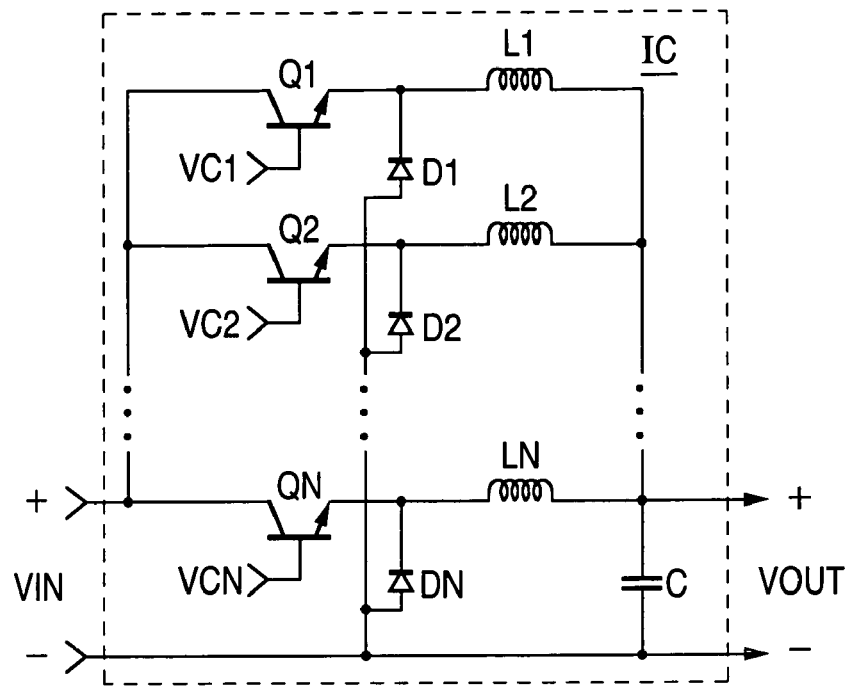
FIG. 2A is a schematic diagram of a buck converter in accordance with one embodiment of the presently claimed invention.

Referring to FIG. 2A, a buck converter in accordance with one embodiment of the presently claimed invention is implemented with multiple buck converter circuits connected in parallel and integrated with an integrated circuit IC. For example, a buck converter having N parallel stages includes: a first buck converter stage with a series input transistor Q1, shunt diode D1 and series output inductor L1; a second buck converter stage with a series input transistor Q2, shunt diode D2 and series output inductor L2; and so on through to the last buck converter stage with a series input transistor QN, shunt diode DN and series output inductor LN, all interconnected substantially as shown. The DC input voltage VIN is applied to one of the output electrodes of each of the transistors Q1, Q2, . . . , QN, and each of the inductors L1, L2, . . . , LN is connected to the output electrode by which the output voltage VOUT is conveyed across the shunt output capacitance C. Operation of each individual buck converter stage is as described above for FIG. 1A. However, each buck converter stage, in accordance with the presently claimed invention, is driven by a different control voltage VC1, VC2, . . . , VCN, with the assertion states of these control voltages VC1, VC2, . . . , VCN being at least partially mutually exclusive. In other words, as discussed in more detail below, the time intervals during which these control voltages VC1, VC2, VCN are asserted are at least partially (preferably substantially) mutually exclusive.

Each of the converter components, i.e., the transistor Q, the diode D and inductor L, are integrated within the integrated circuit in accordance with conventional IC fabrication techniques. By using N inductors in parallel, the current passing through each buck converter stage, and therefore through each inductor, is reduced, thereby reducing the potential for magnetic saturation, and thereby increasing the efficiency of each inductor.

Depending upon the magnitude of the output voltage VOUT, as well as the load current to be conveyed, the output capacitance C can also be integrated as part of the IC, or alternatively can be a discrete component outside the IC across which the output voltage VOUT from the converter is applied for filtering.

Figure 2B:
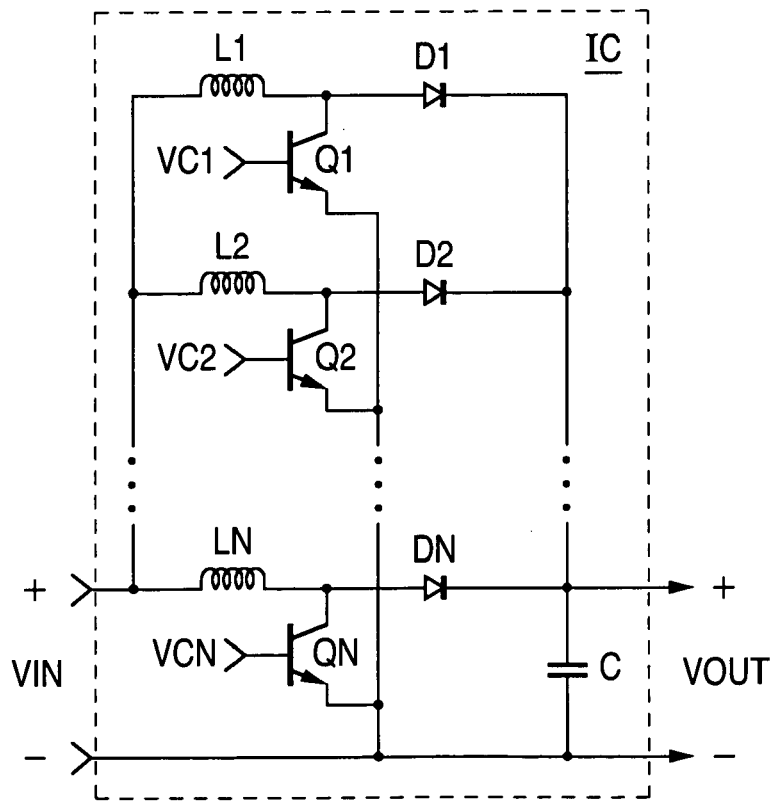
FIG. 2B is a schematic diagram of a boost converter in accordance with another embodiment of the presently claimed invention.

Referring to FIG. 2B, a boost converter in accordance with another embodiment of the presently claimed invention is implemented as N stages of boost converters (with the series input inductance L, shunt transistor Q and series output diode D) connected in parallel. The DC input voltage VIN is implied to each of the inductances, and each of the diodes is connected to the output electrode for conveying the output voltage VOUT across the output inductance C. As with the buck converter of FIG. 2A, each switching transistor, Q1, Q2, . . . , QN is driven by its own respective control voltage VC1, VC2, . . . , VCN with assertion states that are at least partially (preferably substantially) mutually exclusive.

Figure 2C:
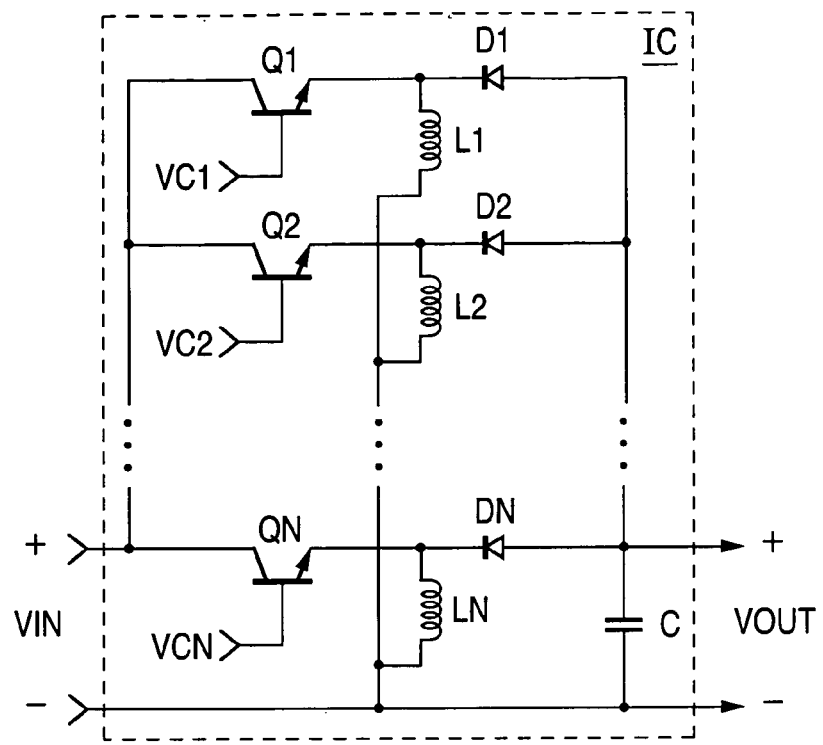
FIG. 2C is a schematic diagram of a buck-boost converter in accordance with another embodiment of the presently claimed invention.

Referring to FIG. 2C, a buck-boost converter in accordance with another embodiment of the presently claimed invention is implemented as N buck-boost converters connected in parallel, with each converter stage having the series input transistor Q, shunt inductance L and series output diode D. The DC input voltage VIN is applied to one of the output electrodes of each of the transistors Q1, Q2, . . . , QN, and each of the diodes D1, D2, . . . , DN is connected to the output electrode to convey the DC output voltage VOUT for filtering across the output capacitance C.

As with the buck and boost converters of FIGS. 2A and 2B, each of the transistors Q1, Q2, . . . , QN is controlled by its own control voltage VC1, VC2, . . . , VCN with respective assertion states that are at least partially (preferably substantially) mutually exclusive.

Figure 3:
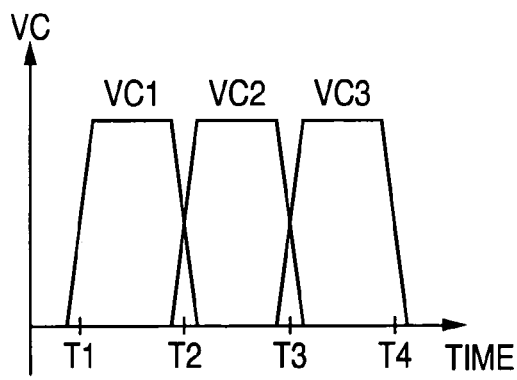
FIG. 3 is a voltage timing diagram for the control voltages used to drive the converter circuits of FIGS. 2A, 2B and 2C.
Figure 4:
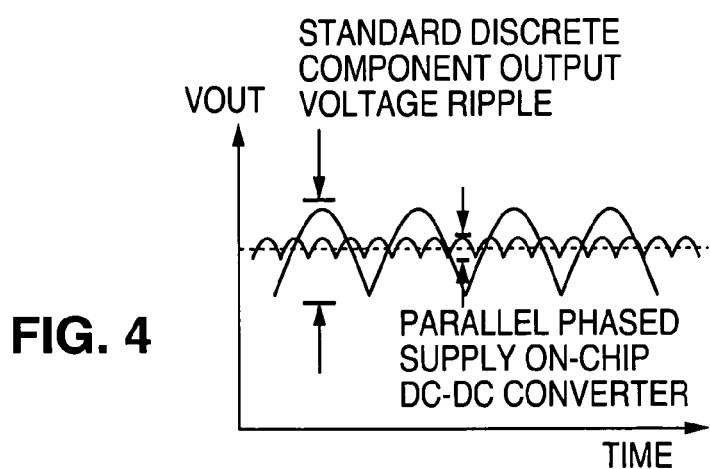
FIG. 4 is a voltage waveform diagram illustrating the relative improvement in output voltage ripple using a DC—DC converter in accordance with the presently claimed invention.

Referring to FIG. 3, in accordance with a more specific embodiment of a buck converter (FIG. 2A), boost converter (FIG. 2B) and buck-boost converter (FIG. 2C) in accordance with embodiments of the presently claimed invention, N=3, i.e., three converter stages (buck, boost or buck-boost) form the overall integrated converter circuit. Accordingly, three control voltages VC1, VC2, VC3 control the switching states of the transistors Q1, Q2, Q3. As discussed above, the assertion states of these control voltages are substantially mutually exclusive. Hence, at any given time, only one converter stage is driving the output electrode to form the output voltage VOUT. The other two stages are substantially off. Referring to FIG. 4, the result of this "phased" application of the three control voltages VC1, VC2, VC3 causes the output electrode to be driven more often during, and therefore for longer sub-intervals of, any given time interval. As a result, the output voltage ripple is substantially reduced, as shown, since the output capacitance C is being charged more often, and thereby has fewer opportunities to discharge.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an integrated buck converter circuit, comprising:
   an input electrode to convey a DC input voltage;
   a plurality of intermediate electrodes;
   an output electrode to convey a DC output voltage which is less than said DC input voltage;
   switching circuitry coupled between said input electrode and said plurality of intermediate electrodes, and responsive to a plurality of control signals by providing, between said input electrode and respective ones of said plurality of intermediate electrodes, a plurality of current paths having respective conduction states during time intervals which are substantially mutually exclusive;
   shunt rectification circuitry coupled to said plurality of intermediate electrodes; and
   a plurality of inductances each one of which is coupled between a respective one of said plurality of intermediate electrodes and said output electrode.

2. The apparatus of claim 1, wherein said plurality of control signals has respective assertion states which are substantially mutually exclusive.

3. The apparatus of claim 1, wherein said switching circuitry comprises a plurality of transistors each of which includes a control electrode and first and second output electrodes with said first and second output electrodes coupled to said input electrode and a respective one of said plurality of intermediate electrodes, respectively.

4. The apparatus of claim 1, wherein said shunt rectification circuitry comprises a plurality of shunt diodes each of which is coupled to a respective one of said plurality of intermediate electrodes.

5. The apparatus of claim 1, further comprising a shunt capacitance coupled to said output electrode.

6. An apparatus including an integrated boost converter circuit, comprising:
   an input electrode to convey a DC input voltage;
   a plurality of intermediate electrodes;
   an output electrode to convey a DC output voltage which is greater than said DC input voltage;
   a plurality of inductances each one of which is coupled between said input electrode and a respective one of said plurality of intermediate electrodes;
   shunt switching circuitry coupled to said plurality of intermediate electrodes and responsive to a plurality of control signals by providing a plurality of shunt current paths having respective conduction states during time intervals which are substantially mutually exclusive; and
   rectification circuitry coupled between said plurality of intermediate electrodes and said output electrode.

7. The apparatus of claim 6, wherein said plurality of control signals has respective assertion states which are substantially mutually exclusive.

8. The apparatus of claim 6, wherein said shunt switching circuitry comprises a plurality of shunt transistors each of which includes a control electrode and first and second output electrodes with one of said first and second output electrodes coupled to a respective one of said plurality of intermediate electrodes.

9. The apparatus of claim 6, wherein said rectification circuitry comprises a plurality of diodes each of which is coupled between a respective one of said plurality of intermediate electrodes and said output electrode.

10. The apparatus of claim 6, further comprising a shunt capacitance coupled to said output electrode.

11. An apparatus including an integrated buck-boost converter circuit, comprising:
    an input electrode to convey a DC input voltage;
    a plurality of intermediate electrodes;
    an output electrode to convey a DC output voltage which is selectively less than or greater than said DC input voltage;
    switching circuitry coupled between said input electrode and said plurality of intermediate electrodes, and responsive to a plurality of control signals by providing, between said input electrode and respective ones of said plurality of intermediate electrodes, a plurality of current paths having respective conduction states during time intervals which are substantially mutually exclusive;
    a plurality of shunt inductances each of which is coupled to a respective one of said plurality of intermediate electrodes; and
    rectification circuitry coupled between said plurality of intermediate electrodes and said output electrode.

12. The apparatus of claim 11, wherein:
    each of said current path conduction states has a duty cycle between zero and unity;
    said DC output voltage is less than said DC input voltage when said duty cycle is between 0.5 and unity; and
    said DC output voltage is greater than said DC input voltage when said duty cycle is between zero and 0.5.

13. The apparatus of claim 11, wherein said plurality of control signals has respective assertion states which are at substantially mutually exclusive.

14. The apparatus of claim 13, wherein:
- each of said control signal assertion states has a duty cycle between zero and unity;
- said DC output voltage is less than said DC input voltage when said duty cycle is between 0.5 and unity; and
- said DC output voltage is greater than said DC input voltage when said duty cycle is between zero and 0.5.

15. The apparatus of claim 11, wherein said switching circuitry comprises a plurality of transistors each of which includes a control electrode and first and second output electrodes with said first and second output electrodes coupled to said input electrode and a respective one of said plurality of intermediate electrodes, respectively.

16. The apparatus of claim 11, wherein said rectification circuitry comprises a plurality of diodes each of which is coupled between a respective one of said plurality of intermediate electrodes and said output electrode.

17. The apparatus of claim 11, further comprising a shunt capacitance coupled to said output electrode.

\* \* \* \* \*

UNITED STATES PATENT AND TRADEMARK OFFICE
CERTIFICATE OF CORRECTION

PATENT NO. : 7,157,891 B1
APPLICATION NO. : 11/057967
DATED : January 2, 2007
INVENTOR(S) : Drury et al.

Figure 1B:
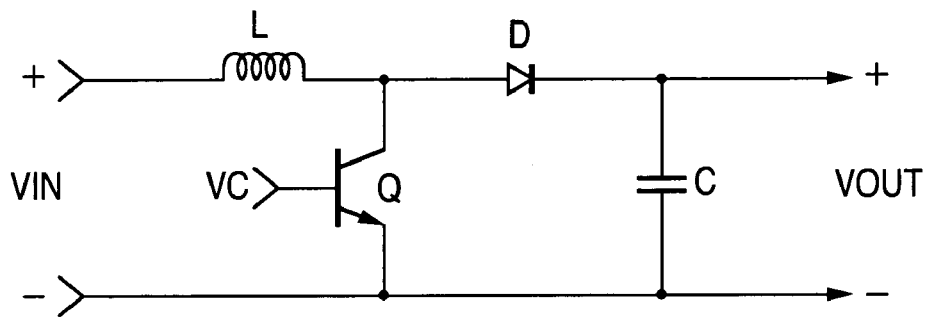
Figure 1C:
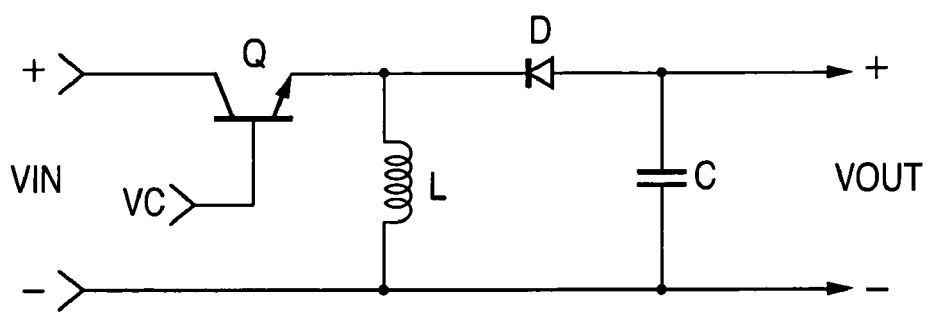

It is certified that error appears in the above-identified patent and that said Letters Patent is hereby corrected as shown below:

On the Title page, in the ABSTRACT item 57, please delete "DC—DC" and insert --DC-DC--;
Column 1, line 8, please delete "DC—DC" and insert --DC-DC--;
Column 1, line 49, please delete "FIB 1B." and insert --FIG. 1B--;
Column 2, line 13, please delete "DC—DC" and insert --DC-DC--;
Column 2, line 27, please delete "DC—DC" and insert --DC-DC--;
Column 3, line 24, please delete "DC—DC" and insert --DC-DC--;
Column 3, line 38, please delete "DC—DC" and insert --DC-DC--; and
Column 7, line 2, claim 13, please delete "at".

Signed and Sealed this

Sixth Day of March, 2007

JON W. DUDAS
*Director of the United States Patent and Trademark Office*